United States Patent
Bühl

(10) Patent No.: US 10,428,876 B2
(45) Date of Patent: Oct. 1, 2019

(54) CLUTCH DISK WITH TORSIONAL ANGULAR-DEPENDENT FRICTION DAMPING DEVICE

(71) Applicant: ZF Friedrichshafen AG, Friedrichshafen (DE)

(72) Inventor: Dominik Bühl, Eltmann (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 173 days.

(21) Appl. No.: 15/623,555

(22) Filed: Jun. 15, 2017

(65) Prior Publication Data
US 2017/0363151 A1 Dec. 21, 2017

(30) Foreign Application Priority Data

Jun. 16, 2016 (DE) .......................... 10 2016 210 740

(51) Int. Cl.
| | |
|---|---|
| *F16D 3/14* | (2006.01) |
| *F16D 13/68* | (2006.01) |
| *F16F 15/123* | (2006.01) |
| *F16D 3/12* | (2006.01) |
| *F16F 15/129* | (2006.01) |
| *F16D 13/64* | (2006.01) |

(52) U.S. Cl.
CPC ............ *F16D 3/14* (2013.01); *F16D 3/12* (2013.01); *F16D 13/644* (2013.01); *F16D 13/68* (2013.01); *F16F 15/123* (2013.01); *F16F 15/129* (2013.01); *F16F 15/12353* (2013.01); *F16D 2300/22* (2013.01); *F16F 2222/04* (2013.01); *F16F 2232/02* (2013.01)

(58) Field of Classification Search
None
See application file for complete search history.

(56) References Cited

U.S. PATENT DOCUMENTS

| | | | |
|---|---|---|---|
| 3,223,214 A * | 12/1965 | Kuivinen | ............... F16D 13/68 188/268 |
| 4,583,959 A | 4/1986 | Yoneda | |
| 5,205,788 A * | 4/1993 | Sacher | .................. B63H 23/32 464/160 |
| 6,446,780 B1 * | 9/2002 | Herbst | ............... F16F 15/1238 192/213.22 |
| 7,559,844 B2 | 7/2009 | Saeki | |

(Continued)

FOREIGN PATENT DOCUMENTS

DE 19958326 6/2001

*Primary Examiner* — Mark A Manley
(74) *Attorney, Agent, or Firm* — Cozen O'Connor

(57) ABSTRACT

A torsion damper with at least one torque input disk and at least one torque output disk, wherein the torque input disk can move in circumferential direction relative to the torque output disk against the force of at least one spring storage, wherein the relative movement is damped by a friction device which generates a smaller friction torque in a first swivel angle range than in a second swivel angle range in that the friction device has at least two friction ring pairs which are rotatable opposite one another and which are activated depending on the swivel angle via a driving connection of at least one friction ring with the torque input disk. The driving connection has a spring element which is arranged functionally in series with the friction device and functionally in parallel with the spring storage.

6 Claims, 7 Drawing Sheets

(56) References Cited

U.S. PATENT DOCUMENTS

2010/0178991 A1\* 7/2010 Hada .................. F16D 13/68
  464/68.1
2014/0087890 A1\* 3/2014 Komuro ............. F16F 15/1292
  464/68.41

\* cited by examiner

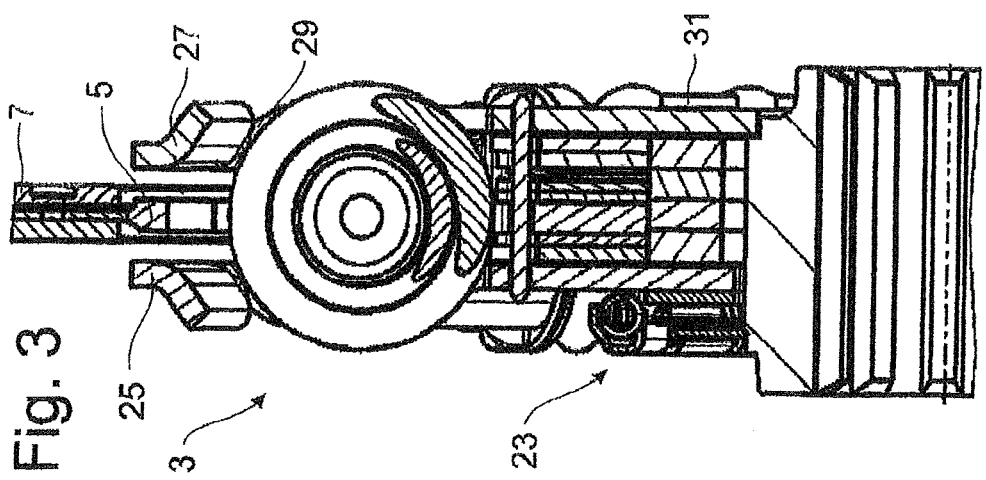
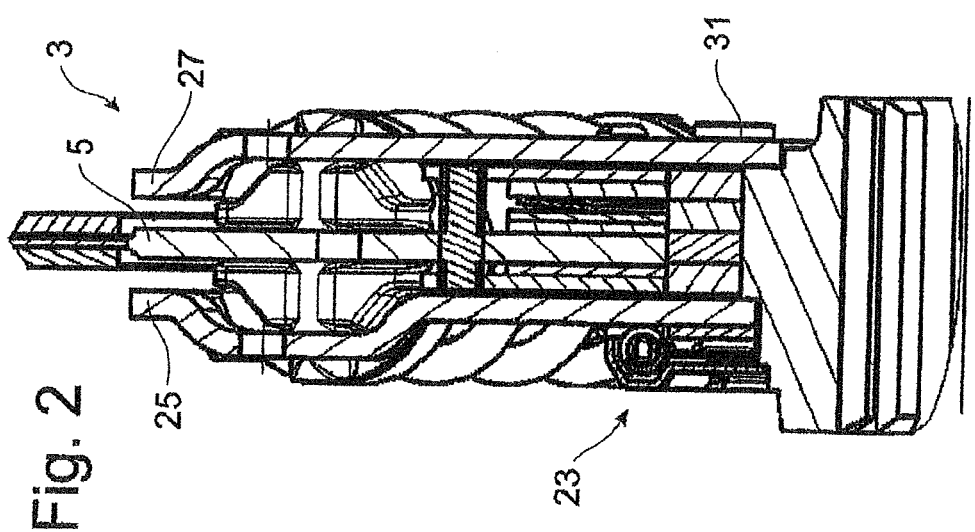

CLUTCH DISK WITH TORSIONAL ANGULAR-DEPENDENT FRICTION DAMPING DEVICE

FIELD OF THE INVENTION

The present invention is directed to a torsion damper with a friction device dependent on the swivel angle.

BACKGROUND OF THE INVENTION

Conventional friction devices not infrequently have the problem of premature failure. Most friction devices operate with constant friction torque and/or constant damping over the entire torsion damper characteristic or are adjusted to a range of characteristics or a spring level. For this purpose, control plates engage in the spring windows or at least have control edges for the springs, e.g., U.S. Pat. No. 7,559,844. However, the level of required friction torque is determined only by the required damping of the powertrain resonance in the respective gear of the transmission. The higher the resonance, the higher the required damping (i.e., friction torque) and, therefore also, the higher the loading of the friction device. The load manifests itself conventionally in higher forces (usually disk springs) and, therefore, higher area pressures in the contact points of the friction device.

In a friction device with a stepped friction torque characteristic such as in U.S. Pat. No. 7,559,844, for example, a distinctly abrupt torque increase which is noticeable as wear at the friction device occurs at the transition between two friction torque levels.

One solution could consist in configuring the preloading force of the aforementioned disk spring of the friction device to be variable over the swivel angle. Reference is made to U.S. Pat. No. 4,583,959, for example. However, this kind of construction principle is itself subject to significant wear and has an internal friction torque which must be taken into account in the configuration of the friction device in its entirety.

It is thus an object of the present invention to minimize the negative effects of the discontinuous torque curve.

SUMMARY OF THE INVENTION

This object is met in that the driving connection has a spring element which is arranged functionally in series with the friction device and functionally in parallel with the spring storage.

In contrast to the cited prior art, the problem is not solved through a complicated friction device but rather by the idea of combining the friction work of the friction device with spring work. In this way, the friction device can be configured in a substantially simple manner. The friction device has a damping effect on the spring storage of the torsion device, but the spring element upstream of the friction device does not. Therefore, the damping action is further limited exactly to the swivel angle range as is desired.

In principle, the spring element upstream of the friction device can be constructed as tension spring. However, the durability of the spring element could be problematic. A particularly stable solution is achieved in that the driving connection is formed by a driving pin or bolt which extends into a cutout of the friction ring, the spring element being arranged between the driving pin and the cutout. The combination of driving pin and cutout allows the spring element to go solid. However, it is also possible to construct the bolt as a web rather than in a round manner, so that the bolt contacts the cutout with reduced friction at the end of the swivel angle, and the deflection of the spring element is not fully utilized, which in turn has a positive influence on the life of the spring element.

It can also be provided that at least one spring element is arranged on both sides of the driving pin in the swivel angle direction. This type of construction leads to the advantage that two springs arranged in parallel affords a very great variability in the selection and dimensioning of the spring elements.

A particularly space-saving solution is wherein the spring element is constructed as a leaf spring. Further, leaf springs with little material volume could generate comparatively large spring forces and do not change their elasticity behavior as markedly under the influence of centrifugal force.

It can also be provided that the spring element is constructed as a helical compression spring.

When using two spring elements, these two spring elements can have a different preloading. In this way, the transition into and out of the operative range of the friction device can be specifically adapted.

The spring element can also be formed as an elastomeric body. Aside from the spring action, an elastomeric body also exhibits an inherent damping. Therefore, the swivel angle range of the torsion damper has been increased by the presence of damping.

In one embodiment, the driving pin supports the spring element, for example, in form of a coating. This obviates the need for securing the spring element. Alternatively, the spring element can also be clamped in the cutout. To this end, a ring element is simply produced and is pressed into the cutout.

BRIEF DESCRIPTION OF THE DRAWINGS

The invention will be described more fully with reference to the following drawings in which:

FIGS. 2-5 are sectional views through the torsion damper of FIG. 1;

DETAILED DESCRIPTION OF THE PRESENTLY PREFERRED EMBODIMENTS

Figure 1:
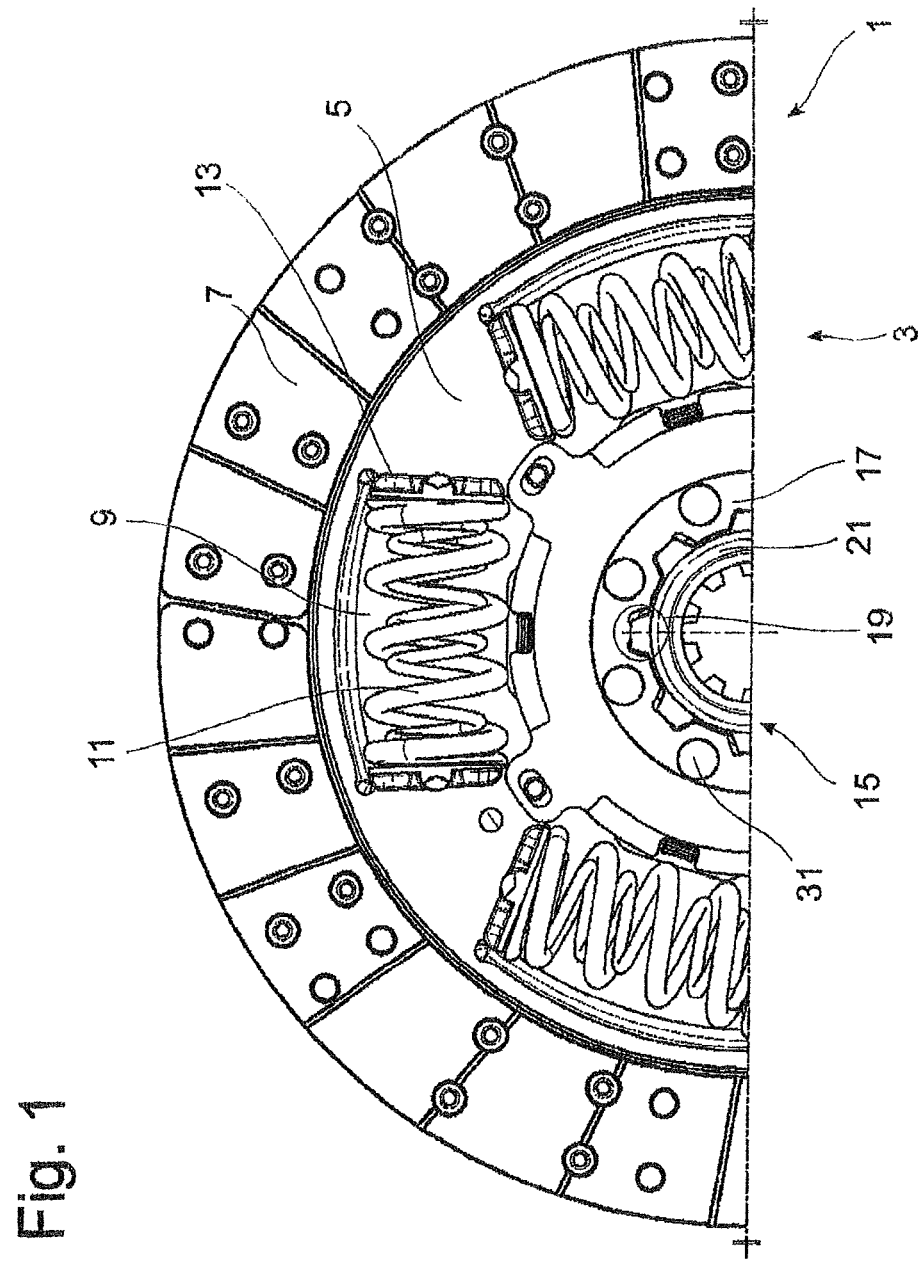
FIG. 1 is a partial front view of a torsion damper with friction lining in accordance with the present invention.

FIG. 1 shows a front view of a partially assembled clutch disk 1 with a torsion damper 3. In principle, the torsion damper can also be applied outside of a clutch disk. It is clear when viewed together with FIGS. 2 and 3 that the torsion damper 3 has a torque input disk 5 which carries a friction lining 7. A torque of a drive motor, for example, is transmitted via a clutch housing, not shown, to the friction lining on this torque input disk 5.

The torque input disk 5 has window-like recesses 9 in which is arranged at least one spring storage 11, e.g., a helical compression spring. In the present example, a supporting disk 13 is inserted between end turns of the helical compression spring 11 and the recess 9.

The torque input disk 5 is centered over its inner diameter with respect to a torsion damper hub 15. For example, the torsion damper hub 15 is constructed so as to be divided in that an outer ring 17 can execute a defined displacing movement in circumferential direction. A connection to an inner hub is made via a tooth profile 19. The relative movement between the outer ring 17 and the inner hub 21 is cushioned via a so-called pre-damper. The functioning and construction of the pre-damper 23 are known, for example, from DE 199 58 326 A1, the entire content of which is hereby incorporated by reference. The pre-damper 23 and the divided torsion damper hub are optional.

Figure 5:
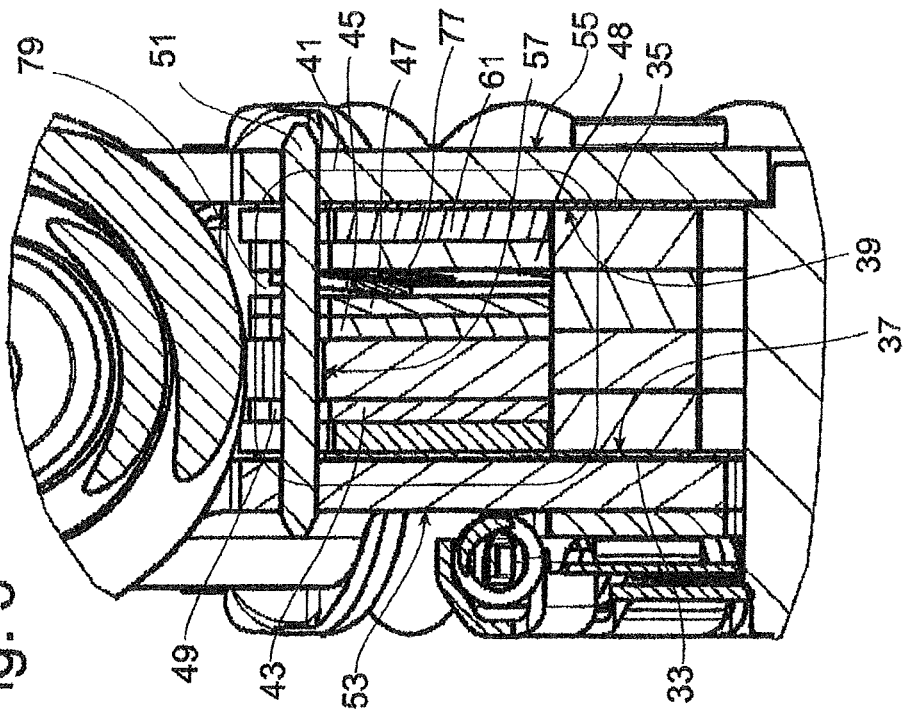
Figure 4:
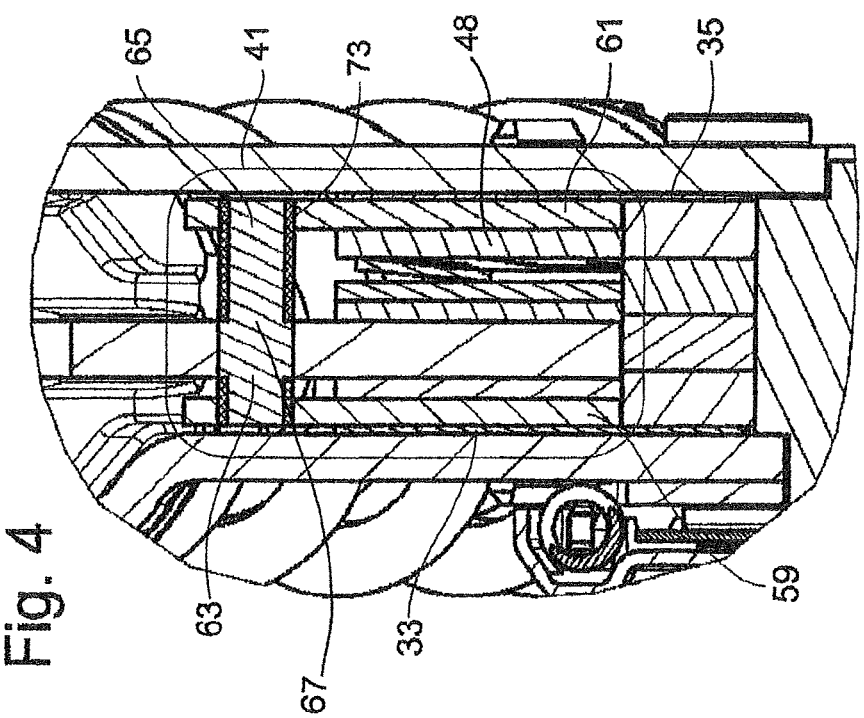

Further, the torsion damper 3 comprises two torque output disks 25; 27 which are arranged on both sides of the torque input disk 5. The torque output disks 25; 27 also have window-like recesses 29 into which the spring storages 11 extend. Depending on the dimensioning of spring storages 11 and window-like recesses 9; 29 in the torque input disk 5 and torque output disks 25; 27, the two disk groups can move relative to one another in circumferential direction. The two torque output disks 25; 27 are connected to the outer ring 17, for example, via a rivet connection 31, axially and rigidly in circumferential direction. A wear protection disk 33; 35 can optionally be arranged on both sides of the outer ring 17. This wear protection disk 33; 35 is captured by the rivet connection 31 so that the wear protection disks 33; 35 are supported in circumferential direction so as to be stationary with respect to the torque output disk 25; 27. The wear protection disks 33; 35 face with their friction surface 37; 39 in direction of the torque input disk 5 (see FIGS. 4 and 5).

The relative movement between torque input disks 5 and torque output disks is damped by a friction device 41. The friction device 41 comprises a first group of friction rings 43; 45; 47; 48 with friction surfaces which are supported in circumferential direction so as to be stationary with respect to the torque output disks 25; 27 and contact the latter directly on both sides of the torque input disk 5. These friction rings 43-48 can be made of a metal material, for example, so as to make use of a high abrasion resistance on the one hand and a comparatively high friction coefficient on the other hand. At their outer diameter area, the friction rings 43; 45; 47; 48 of the first group have a cutout 49 for a spacer bolt 51 which extends transversely through the torsion damper 3 and passes through outer cover surfaces 53; 55 of the torque output disks 25; 27, or is possibly staked with the cover surface 53; 55. The cutouts 49 in the friction rings 43-48 are dimensioned in circumferential direction such that a certain play is available for assembly, whereas no additional clearance is provided otherwise.

The torque input disk 5 also has a through-cross section or window 57 for the spacer bolt 51, which through-cross section 57 is dimensioned in circumferential direction so as to be at least as large as the entire swivel angle of the torsion damper 3.

The torsion damper has a second group of friction rings 59; 61 with friction surfaces which is supported in a first swivel angle range of the torsion damper 3 relative to the torque input disk 5 and relative to the torque output disks 25; 27. The friction rings 59; 61 of the second group are arranged in each instance between the friction rings 43-48 of the first group and the torque output disks 25; 27. Insofar as wear protection disks 33; 35 are provided, the friction rings of the second group are located between the wear protection disks 33; 35 and the friction rings 43-48 of the first group. In principle, the friction rings 43-48; 59; 61 of the two friction ring groups can also have different friction coefficients so that, e.g., the friction rings 43-48 of the first group have a lower friction coefficient and for that reason are fashioned from plastic, for example.

Figure 6:
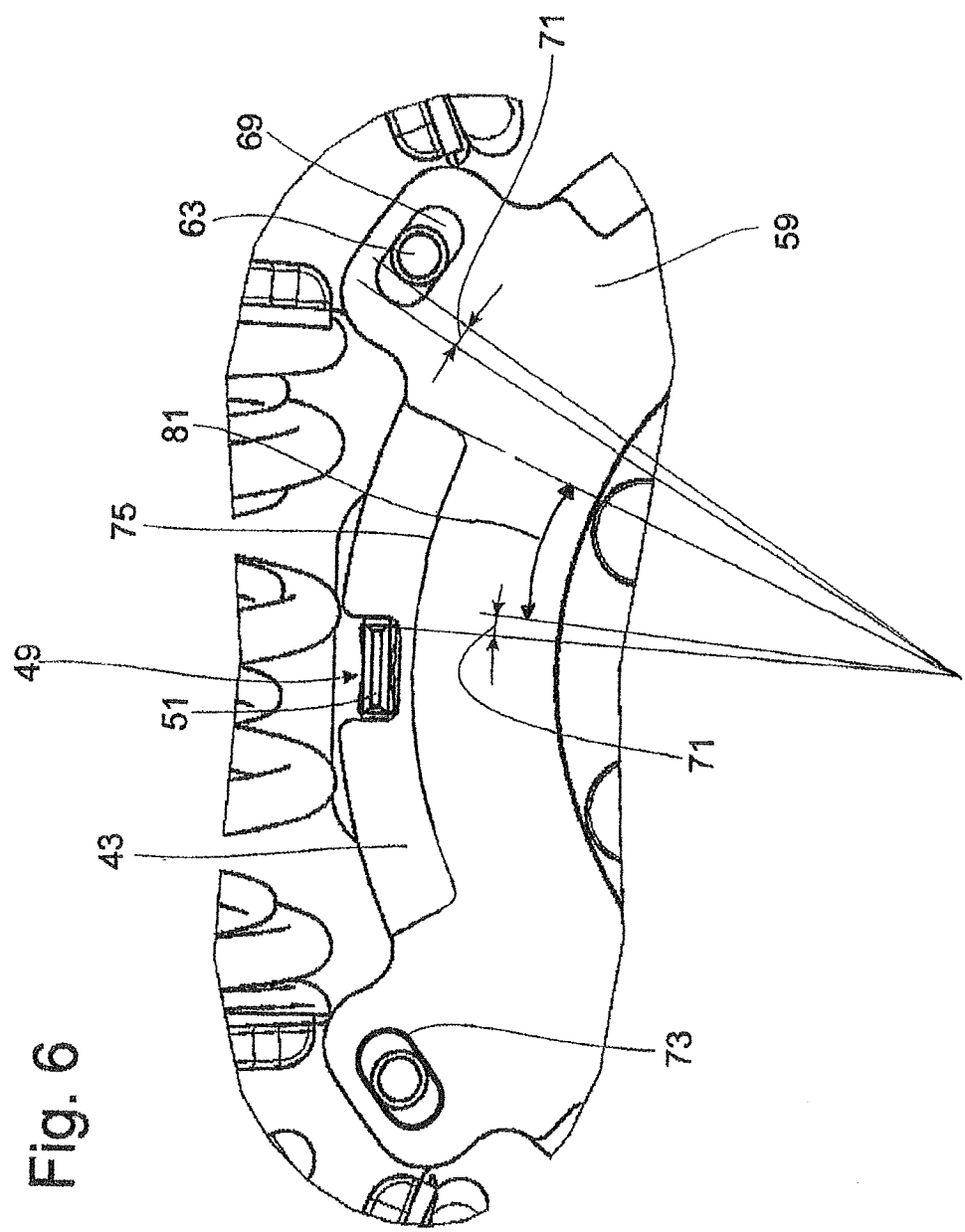
FIG. 6 is a partial enlargement from FIG. 1.

The second group of friction rings 59; 61 is controlled via a quantity of driving pins 63; 65 of the torque input disk 5. These driving pins could be shaped directly out of the material of the torque input disk. In this example, however, the driving pins 63; 65 are formed by a separate bolt 67 which is fixedly anchored in the torque input disk. The control of the friction rings 59; 61 is carried out via a driving connection between the driving pin 63; 65 or bolt 67 and cutouts 69 in the friction rings 59; 61 in which the bolts engage. Cutouts 69 are dimensioned in circumferential direction in such a way that the driving connection is not closed until a first swivel angle range 71 of the torsion damper 3 is traversed. To minimize or prevent impact noises and wear of the friction rings 59; 61, a spring element 73 is arranged between the driving pin 63; 65 or bolt 67 and the edge of cutout 69 (compare FIG. 4 with FIG. 6). Specifically, the bolt 67 in this embodiment example carries an elastomeric body which is preferably formed by a coating. However, it is also possible that the spring element 73 is clamped in the cutout 69 of the friction rings 59; 61 as is shown in FIG. 6. FIG. 6 shows the driving connection with the first swivel angle range 71 and the connection between the spacer bolt 51 and a friction ring 59 of the second group, which connection is fixed with respect to rotation in circumferential direction. Further, a clearance 75 which describes the entire swivel angle in circumferential direction can be seen in the friction ring 59 of the second group.

A spring arrangement 77 in the preferred constructional form of a disk spring exerts an axial preloading force on the entire friction device 41. The two torque output disks 25; 27 form the axial supporting elements. FIGS. 2 to 5 show that the friction devices 41 can also have an odd number of friction rings. For example, two friction rings 45; 47 of the first group are arranged directly adjacent to one another between the disk spring 77 and the torque input disk 5 in order to achieve a defined axial length. The axial installation space 79 and, therefore, the preloading of the disk spring 77 can be determined by this step.

Figure 7:
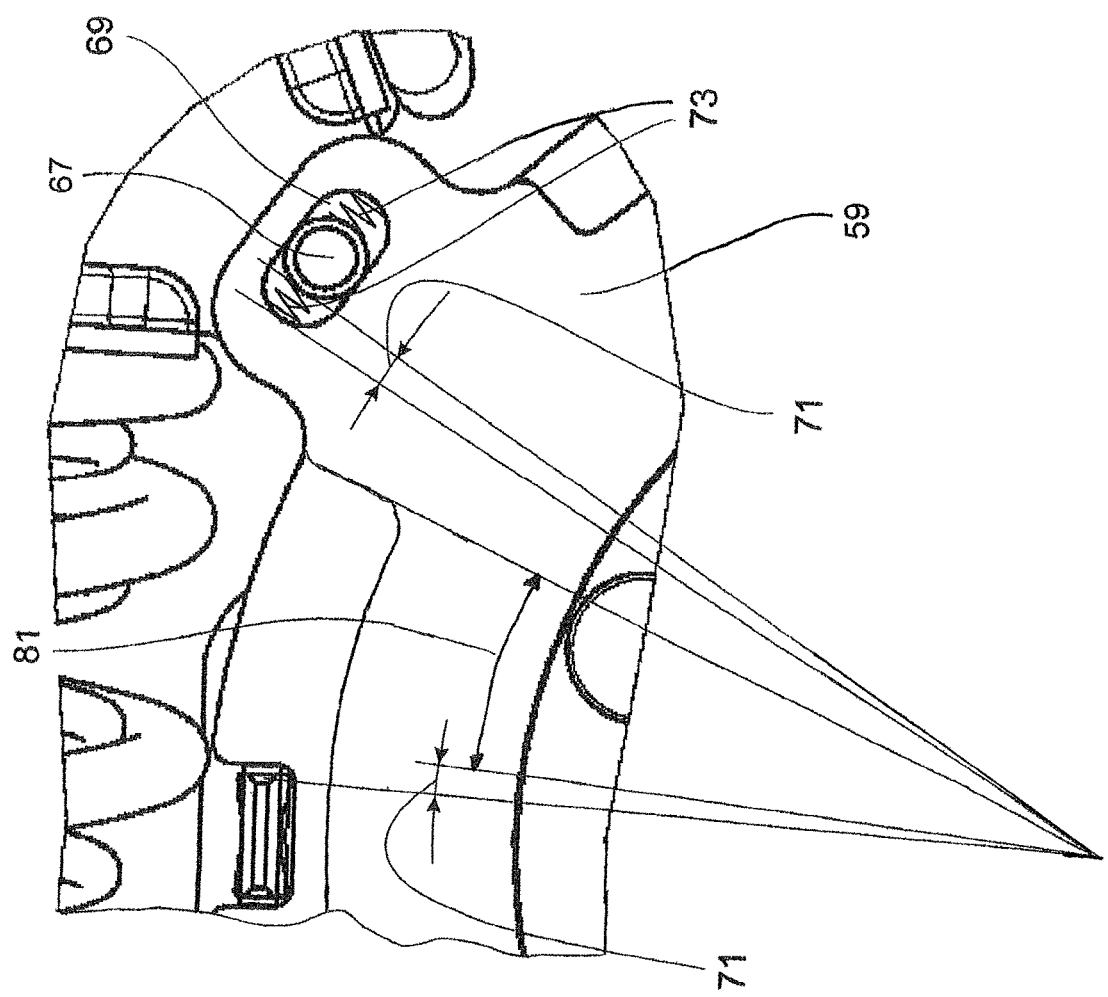
FIGS. 7-8 are views of alternative embodiments of the torsion damper of FIG. 6.

In FIG. 7, the spring elements 73 are constructed as helical springs and are arranged on both sides of the bolt 67. Because of the substantially radial arrangement of the spring elements 73, the latter are dependent upon centrifugal force only to a very slight extent.

Figure 8:
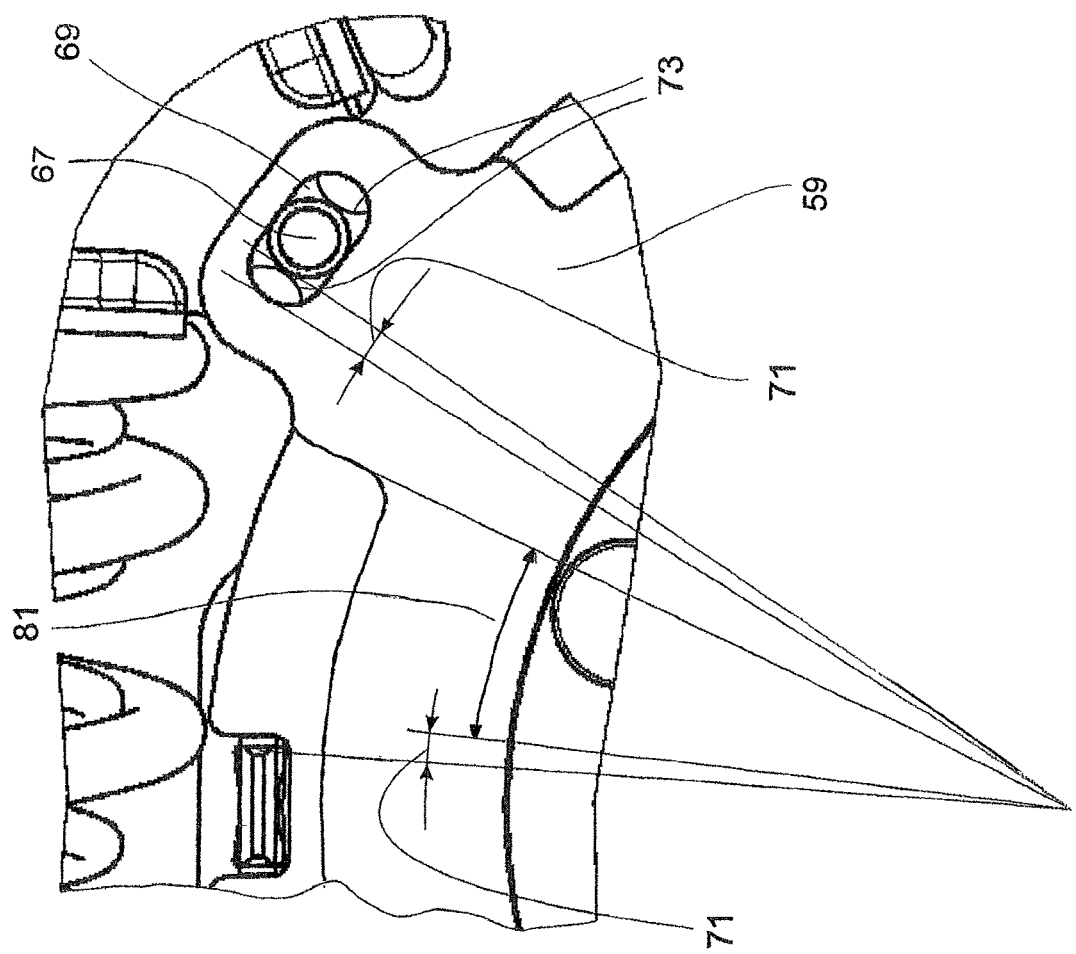

FIG. 8 shows that leaf springs can also be used as spring elements 73 in principle.

Figure 10:
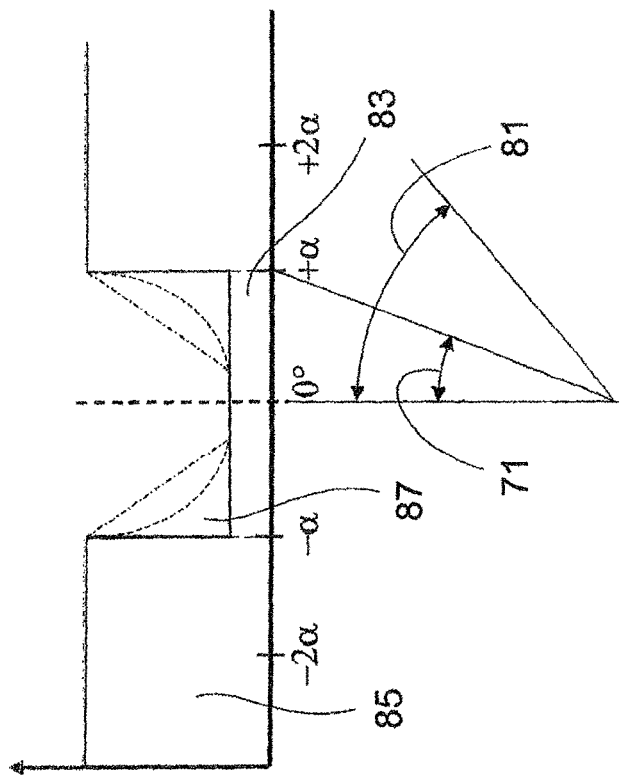
FIG. 10 characteristic of the friction device with the spring elements.
Figure 9:
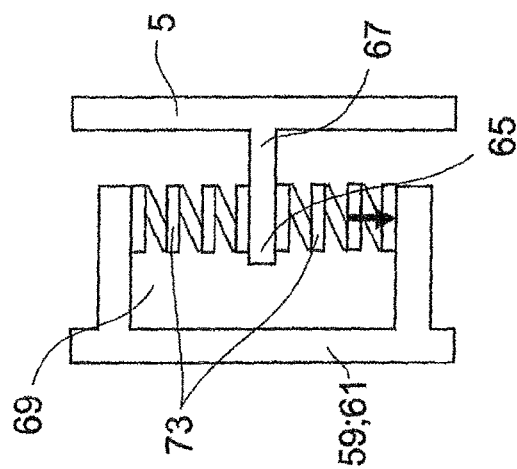
FIG. 9 is a schematic diagram of the embodiments of FIGS. 7 and 8.

FIG. 9 shows an equivalent model of the driving connection between the bolt 67, the spring elements 73 and the cutout 69. The spring elements 73 are arranged on both sides of the bolt 67. In principle, at least three basic spring adaptations are possible. The two spring elements 73 have a residual preloading at the end of the first swivel angle range 71. Alternatively, a spring element can also lose the preloading at the end of the first swivel angle range 71, or at least one spring element 73 has practically no significant preloading already in the basic position as shown in FIG. 9. Any intermediate forms or combinations between these basic adjustments are possible so that the transition from the spring work of the spring elements 73 to the friction work of the friction device 41 can be configured very variably as is shown in FIG. 10. The friction device 41 has a characteristic with a virtually rectangular transition of the friction torque between the two friction torque ranges 83; 85 of the swivel angle ranges 71; 81. The area 87 of spring work of the spring elements which can be determined so as to rise linearly or progressively, for example, via the characteristic of the spring elements 73 is in front.

When torque is introduced via the torque input disk 5, the latter rotates in circumferential direction relative to the torque output disks 25; 27. The spring storages 11 form a counter-torque which increases over the entire swivel angle. There is a relative movement between the friction rings of the second group 59; 61 and the torque input disk 5 in the first swivel angle range 71. Consequently, a friction torque caused by the friction device 41 also occurs. The bolt 67 can move in circumferential direction in the first swivel angle range without the friction rings 59; 61 of the second group carrying out a rotational movement. Consequently, the friction rings 59; 61 of the second group in cooperation with the torque output disks 25; 27 do not generate any friction torque and are therefore also not subjected to wear.

When the friction rings 43-48 of the first group have a smaller friction coefficient than the friction rings of the second group, then only a small friction torque is also in effect. When the driving connection between the bolt 67 and the second group of friction rings 59; 61 is closed and the spring element 73 or the spring element in the driving connection is preloaded to the maximum extent at the end of the first swivel angle range 71, a second swivel angle range 81 commences and, in addition to the relative movement of the first group 43-48 with the torque input disk 5, there is a relative movement, synchronous with the torque input disk 5, between the friction rings 59; 61 of the second group with the wear protection disks 33; 35 and the friction rings 43-48 of the first group. In addition, friction rings 43 and 48 rub with friction rings 59 and 61. Friction rings 59; 61 of the second group have a higher friction coefficient and, owing to the additional two pairs of friction surfaces, the friction torque increases appreciably in the second swivel angle range. Consequently, the spring elements 73 are functionally arranged in series and the spring storages are functionally arranged in parallel with respect to the friction device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsion damper comprising:
   at least one torque input disk (5);
   at least one torque output disk (25; 27);
   the at least one torque input disk (5) and the at least one torque output disk constructed to perform movement in circumferential direction relative to the at least one torque output disk (25; 27) against the force of at least one spring storage (11);
   a driving connection (63-69);
   a friction device (41) for damping the relative movement by generating a smaller friction torque in a first swivel angle range (71) than in a second swivel angle range (81), the friction device (41) comprising at least two friction rings (43-47; 59; 61) which are rotatable in opposite direction relative to one another and which are activated depending on the swivel angle by the driving connection (63-69) of the at least two friction rings with the torque input disk (5);
   wherein the driving connection (63-69) comprises a spring element (73) arranged functionally in series with the friction device (41) and functionally in parallel with the spring storage (11);
   wherein the driving connection (63-69) is formed by a driving pin (63; 65) which extends into a cutout (69) of one of the at least two friction rings (59; 61), and wherein the spring element (73) is arranged between the driving pan (63; 65) and the cutout (69); and
   wherein at least one spring element (73) is arranged on both sides of the driving pin (63; 65) in the swivel angle direction.

2. The torsion damper according to claim 1, wherein the spring element (73) is constructed as a leaf spring.

3. The torsion damper according to claim 1, wherein the spring element (73) is constructed as a helical compression spring.

4. The torsion damper according to claim 1, wherein the two spring elements (73) have a different preloading.

5. The torsion damper according to claim 1, wherein the spring element (73) is formed by an elastomeric body.

6. The torsion damper according to claim 1, wherein the spring element (73) is clamped in the cutout (69).

\* \* \* \* \*